Aug. 28, 1956     D. A. DAHLSTROM     2,760,635
PROCESS AND APPARATUS FOR SEPARATING MIXTURES
OF SOLIDS IN A LIQUID MEDIUM
Filed Feb. 17, 1953     6 Sheets-Sheet 1

INVENTOR
DONALD A. DAHLSTROM,
BY William Fox
ATTORNEY

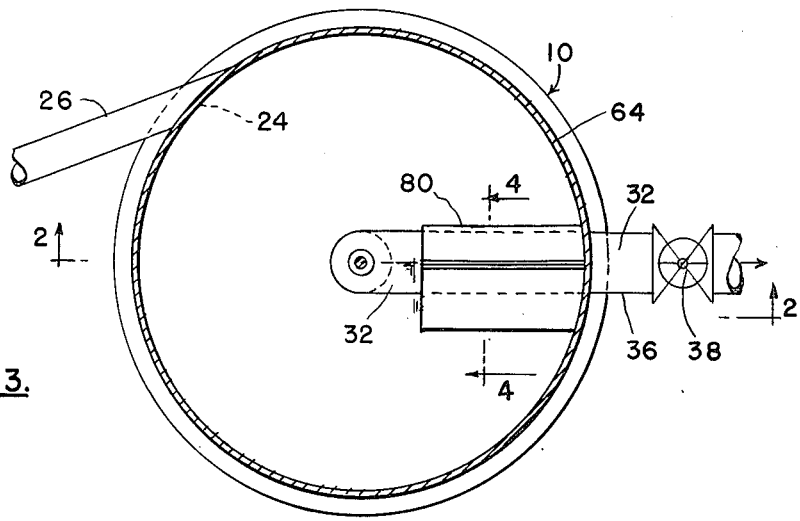
FIG. 3.
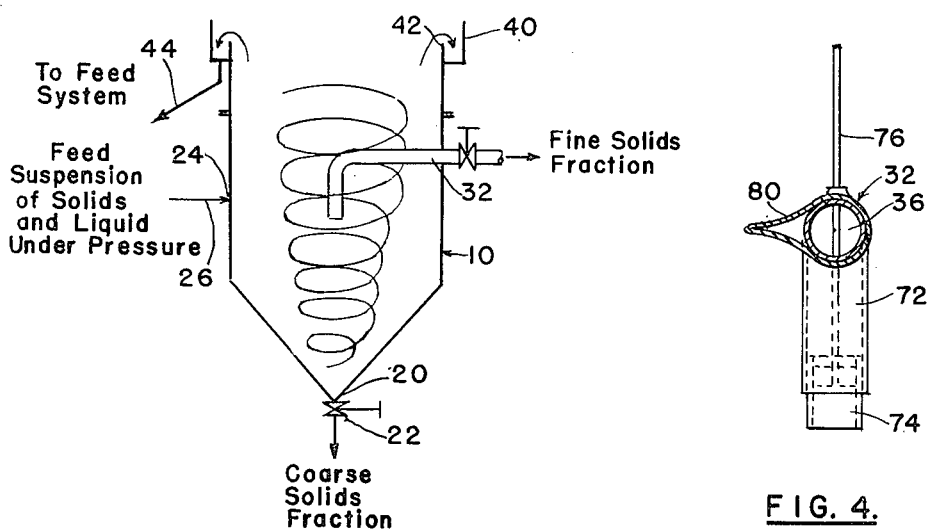
FIG. 5.
FIG. 4.
INVENTOR
DONALD A. DAHLSTROM,
BY William Fox
ATTORNEY Aug. 28, 1956  D. A. DAHLSTROM  2,760,635
PROCESS AND APPARATUS FOR SEPARATING MIXTURES
OF SOLIDS IN A LIQUID MEDIUM
Filed Feb. 17, 1953                                  6 Sheets-Sheet 4

INVENTOR
DONALD A. DAHLSTROM,
BY William Fox
ATTORNEY

United States Patent Office 2,760,635
Patented Aug. 28, 1956

2,760,635

PROCESS AND APPARATUS FOR SEPARATING MIXTURES OF SOLIDS IN A LIQUID MEDIUM

Donald A. Dahlstrom, Deerfield, Ill., assignor to Dorr-Oliver, Incorporated, a corporation of Delaware Application February 17, 1953, Serial No. 337,281

10 Claims. (Cl. 209—211)

This invention relates to a high capacity, self-regulating method and apparatus for the separation on the basis of settling rates of particulate solids suspended in a liquid medium.

It is well known that solids can be separated in a liquid medium on the basis of differences in settling rates into at least two fractions. The settling rates of particles in a liquid medium depend on such factors as differences in specific gravity, differences in particle size, and on differences in particle shape. In all separations into at least two fractions where there are particles of gradually varying settling rates, separation occurs about an intermediate settling rate possessed by the so-called equilibrium particle. This is referred to herein as the point of separation. In other words, particles displaying settling rates greater than that of the equilibrium particle will be collected into one fraction, referred to herein as the underflow fraction while the particles displaying settling rates less than that of the equilibrium particle will be collected in another fraction referred to herein as the overflow fraction. Particles having the same settling rate as the equilibrium particle will be found in the underflow fraction in direct proportion to the amount of liquid medium, in which the separation is performed, is collected in that fraction. It is preferred in most instances to obtain as sharp a separation as possible. In other words, it is preferred to have particles of settling rates greater than that of the equilibrium particle in the underflow fraction only and not mixed in the overflow fraction with particles of less settling rates and similarly it is preferred to have particles of settling rates less than that of the equilibrium particle in the overflow fraction only. The sharpness of separation, or the efficiency of separation, is indicative of the degree of attainment to this preferred condition.

Classification as used herein is defined as the separation of solid particles into at least two fractions on the basis of particle size. Accordingly, a device adapted to classify particles suspended in a liquid medium is frequently termed a classifier. The classification point, or size of separation as used herein, is the particle size, expressed sometimes in terms of Tyler mesh screen size and other times in terms of microns, of the equilibrium particle. Particles larger than this size are usually termed coarse solids whereas particles smaller than this size are usually called fine solids.

Separations based on differences of specific gravity and on differences in particle shape are generically termed herein as sink-float separations since, in either case, under the influence of settling forces the particles tend to either sink or float depending on their specific gravity or their particle shape. The specific gravity of separation is defined herein as the specific gravity of the equilibrium particle. A device used to carry out such separations is called a specific gravity separator. Particles having specific gravity greater than equilibrium particles are termed heavy or sink particles while particles having specific gravity less than equilibrium particles are termed light or float particles.

For the sake of simplicity, the problems which the invention solves are discussed hereinafter in relation to classification, although it will be realized such problems are encountered in the other before-mentioned types of separation.

Gravitational classification has been employed for many years as a basic tool in the beneficiation of minerals and coal. While many improvements have been made to increase efficiency and fields of application, the basic flow pattern has remained relatively unchanged in most gravitational classifiers. The feed of liquid and solids in suspension is introduced into a settling pool wherein the coarser solids settle under the influence of the force of gravity against either an upward or horizontal liquid current (or a combination of both) and are withdrawn in a concentrated underflow stream. The finer solids below the classification point possess too low a settling velocity and thus are primarily swept out over a weir overflow by the bulk of the liquid. Because of its simplicity, efficiency, low power requirements and maintenance costs, gravitational classification finds a wide acceptance for separations in the approximate range of 20 to 325 mesh. However, two factors resulting from the basic flow pattern employed in gravitational classification present some difficult problems under certain conditions.

If classification of solids at 60 to 200 mesh of separation is desired, capacity in terms of gallons of overflow per minute per square foot of settling pool area must be low to allow the required solids to settle out and be withdrawn in the underflow. If one to twenty thousand or more gallons per minute of feed suspension must be handled, either a very large classifier or a number of smaller units must be employed resulting in the consumption of a large floor space and head room. Examples of this are to be found in the large classifiers, "wetting tanks," or settling tanks used in the coal industry for the recovery of process water from fine solids. Units are large as fifty or sixty feet in diameter and 60 feet high requiring substantial amounts of steel are not uncommon.

A second factor is the lack of "self-regulation" in gravitational classification. As the overflow rate increases, accordingly the size of separation increases, which normally enlarges beneficiation difficulties. If a fine size of separation is required at varying feed rates, the problem is more than doubled in complexity.

On the other hand, one of the primary advantages of gravitational classification is the low power requirement. Either gravity feeds or very low pressure heads are employed. However, fluid energy is still present in the inlet feed stream and provision usually must be made in gravitational classifiers to properly dissipate it in order to obtain uniform upward or horizontal currents. Rather than waste this energy, it would be desirable to utilize it to secure a degree of "self-regulation" and simultaneously increase classification capacity per square foot of area.

Classification by centrifugal forces has also been employed to great advantage. It is well known that centrifugal forces many thousand times that of gravitational force can be generated. Particles placed in such large centrifugal force fields will exhibit settling rates much higher than those exhibited in a gravity force field. To take advantage of this phenomenon, devices have been used wherein solids to be classified are continuously introduced into a whirling body of liquid, or vortex, rotating at such velocities and producing thereby such enormous centrifugal forces, that the force of gravity has no noticeable effect of the classification therein. Such devices are adapted to permit the coarse particles to "settle"

in the field of centrifugal force against either an upward or horizontal liquid current (or combination of both) and are withdrawn in an "underflow" stream whereas the fine particles, below the classification point, possessing too low a settling velocity are primarily swept out in an "overflow" stream. Such devices are either of the forced vortex type or of the free vortex type.

A good example of the forced vortex type is the well known centrifuge, wherein the body of liquid is whirled in a cylindrically shaped basket rotating on its axis. The centrifuge, however, has certain disadvantages that stem from the type of vortex developed. Because in a forced vortex the radial velocity is constant at any radial distance from the axis of revolution, the closer the axis of revolution is approached the less are the centrifugal force. Consequently, the centrifuge must be so adapted, in order to have a sharp classification, that the particles in suspension to be classified are introduced into and maintained close to the periphery of the vortex before being withdrawn in their respective size fractions. Thus, the capacity of centrifuges is low, and generally centrifuges are useful only in making extremely fine classifications of particles of relatively fine size. Furthermore, because of the moving parts of a centrifuge, power requirements and maintenance costs are very high. Also, upon an increase in flow rates the size of separation tends to increase and classification tends to become poor.

The free vortex type of classifier is exemplified by the so-called hydrocyclone, such as described in the U. S. A. Patent 2,377,525, and which, in the art of beneficiation, is the most common application of the free vortex. Such a device usually comprises a radially symmetrical pressure chamber of a general conical shape with the base thereof closed off by a plate or end closure member provided with a coaxially aligned outlet through which a tubular member is inserted. A coaxial outlet is provided at the apex of the cone. By means of a feed inlet tangentially disposed to the side of the chamber at the wide end thereof, the feed suspension of liquid and solids to be classified is forcibly and continuously introduced into the chamber whereby a pressurized, whirling body of liquid is established wherein centrifugal force is so great that the effect of gravity is not noticeable. Accordingly, the hydrocyclone can be operated in any position. By continuously discharging liquid suspension from both the base outlet and the apex outlet classification of the particles occurs and there is segregated a fine solids fraction and a coarse solids fraction, the fine solids fraction discharging through the base outlet as overflow, and the coarse solids fraction discharging through the apex outlet as underflow.

One advantage that the hydrocyclone exhibits over both gravitational classifiers and the centrifugal type classifier lies in the extremely sharp classifications that are obtainable. Furthermore, it is important to note that within the hydrocyclone, under operative conditions, centrifugal forces are relatively greater near the axis of revolution that at the outer radius of the whirling body of liquid. This fact plus that of uniformity of the flow pattern within the hydrocyclone account for the very sharp classifications which can be obtained therein. However, a mesh of separation greater than 150 mesh cannot be sharply obtained by means of conventional hydrocyclones. Another disadvantage resides in fluctuating feed rates. If feed rate increases, centrifugal forces in the hydrocyclone increase so much faster than the liquid drag forces tending to sweep particles to the overflow, that the classification point is actually shifted to a finer particle size. If feed rate decreases, centrifugal forces therein decrease so much faster than the liquid drag forces, that the classification point is shifted to a coarser particle size.

As mentioned before, the same or similar problems are confronted in all other types of separations performed in a gravitational field or in a centrifugal field.

In general, it is one object of this invention to develop a continuous method of separation and a separator that combine the foregoing advantageous features of gravitational separation and separation in a free vortex.

More specifically, it is one object of this invention to develop a separating apparatus that has an enormous capacity in terms of gallons of feed suspension treated per minute per unit of space occupied.

A further object of this invention is to develop a separator that is self-regulating, in that the point of separation remains substantially constant in spite of variations in feed rates.

Another object of this invention is to develop a separator with low power requirements comparable to those for gravitational separators. In particular, it is an object to develop a continuous separator wherein advantageous use of all the fluid energy in the feed stream to the separator may be obtained.

Still another objective of this invention is to obtain a sharper separation or more efficient separation than has been heretofore realized.

Still another object of this invention is to devise a classifier with no moving parts and with a minimum of structural parts.

These and possibly other objects are achieved by my invention.

In summary, my invention essentially comprises a vessel adapted to contain a free whirling body of liquid, and adapted so that under operative conditions at least a portion of the top surface of the body is free to rise and fall against the atmosphere. Horizontally, the interior of the vessel is radially symmetrical, furnishing thereby a smooth, unobstructed surface of revolution for the body of liquid. Vertically, it is required that at least the bottom portion of the vessel be conically shaped. The top portion of the vessel in the preferred embodiments is required to be adapted to permit the interior of the vessel to be in contact with the atmosphere while at the bottom of the vessel there is a coaxial outlet, referred to herein as the apex outlet or the underflow discharge outlet, for the withdrawal of underflow. A feed conduit is required which enters the vessel tangentially at an elevation below the top thereof but substantially above the bottom and with its outlet, the feed inlet, opening onto and terminating at the surface of revolution below the lowermost operative liquid level in the vessel. Vortex overflow withdrawal means are required, which means comprise a vertical, coaxially aligned, tubular section, termed herein as the overflow vortex finder, extending from an elevation at or near that of the feed inlet upwardly to join a conduit section extending therefrom into and through the surface of revolution, and adapted to lie so that no part of the conduit is above the lowermost normal operative liquid level when the apex outlet is open to the atmosphere. If the apex outlet is operatively submerged in liquid then all that is required is that the vortex finder be adapted to continuously lie under operative conditions below the lowermost liquid level of the body of liquid. In this case, a siphon effect is relied upon to withdraw the vortex overflow from the vessel. Means may be provided for adjusting the average normal operative rate of flow through the feed conduit. Means also may be provided for adjusting the average normal operative rate of flow through the vortex overflow conduit. Similarly, means may be provided for adjusting the average normal operative rate of flow through the apex outlet.

Under operative conditions, a feed suspension of liquid and solids to be separated is introduced under a pressure or hydrostatic head and at an average flow rate through the feed conduit tangentially into the vessel along the surface of revolution, whereby a whirling body of liquid suspension is established. The feed pressure or hydrostatic head must be at least sufficient to establish and maintain a free vortex in the body of liquid whereby centrifugal forces are developed. The average flow rate of the feed must be sufficient to establish and maintain a liquid level in the vessel at such an elevation above the conduit section of the overflow means that the lowermost level to which the top surface of the body of liquid falls under normal operation decreases in feed flow rate will not be below the highest elevation of the vortex overflow means conduit section when the apex outlet is open to the atmosphere and below the inlet to the vortex finder when the apex outlet is not open to the atmosphere. Under these conditions a free vortex flow pattern similar to that found in the conventional hydrocyclone will be established. However, the centrifugal forces will not be as strong as those in the hydrocyclone. Furthermore, as in the conventional hydrocyclone, when the apex outlet is open to the atmosphere a central air core or column will be found extending therefrom about the vessel center line up and through the vortex finder.

Upon entering the whirling body of liquid the solids to be separated commence to settle under the influence of both centrifugal forces and the force of gravity towards the surface of revolution. However, there is a constant liquid flow into the overflow stream. Consequently, solids to be separated having a settling velocity less than the velocity of the liquid reporting to the overflow stream are swept or dragged into the overflow stream and are withdrawn from the vessel through the vortex overflow means whereas solids to be separated having a settling velocity greater than the velocity of the liquid sweeping particles into the overflow stream will be removed in the underflow stream.

Because at least a portion of the top surface of the whirling body of liquid is in contact with the atmosphere, when feed flow rates fluctuate due to plant surges and the like, the level of the surface of the whirling body in contact with the atmosphere will fluctuate in a direct relationship. If there be a surge in the feed suspension flow rate the overflow rate will tend to increase. However, some of the increased liquid energy will be primarily utilized towards raising the liquid level, and the remainder will be consumed in increasing the centrifugal forces of the vortex. The centrifugal forces will therefore tend to increase only at the same rate as the liquid drag forces which are sweeping particles into the overflow stream. Consequently, the point of separation or the settling rate of the equilibrium particle will tend to remain substantially constant during moments of feed rate surges. Similarly, if there be a momentary decrease in the feed suspension flow rate, the overflow rate will proportionately decrease. However, the liquid level of the body of liquid will also proportionately decrease, thereby releasing energy which is then utilized to maintain the strength of the centrifugal forces. Consequently, centrifugal forces will tend to decrease at the same rate as the liquid drag forces which are sweeping particles into the overflow stream. The energy maintained in the "head" of the liquid, represented by the differences in levels before and after the momentary decrease in the flow rate, is converted into kinetic energy to maintain the free vortex action. Consequently, the point of separation will tend to remain substantially constant even though there be a decrease in overflow rate. Thus, the invention is characterized by self-regulation of the point of separation under conditions of normal operative fluctuations in feed flow rate.

The invention is also characterized by the feature of self-regulation under conditions of normal operative fluctuations in feed solids concentration. However, this self-regulation effect is not quite as pronounced as the self-regulation effect in cases of fluctuations in feed flow rates.

These self-regulating features are also effective at any operative underflow withdrawal rate up to the rate where the underflow discharge becomes overloaded. It should be noted that at constant feed solids concentration, decreasing the underflow withdrawal rate tends to increase the underflow solids concentration. The overloaded condition is characterized by the rope-like discharge through the apex outlet in contrast to the spray-like discharge occuring at lower solids concentration when the apex outlet is open to the atmosphere. It is apparently due to a viscosity effect resulting from high solids concentration. A similar underflow condition can be obtained in the conventional hydrocyclone but solid recovery in the underflow is very severely decreased and most of the particles will be found in the overflow. With this invention, however, under overloaded underflow conditions particles of the highest settling velocity present are not dragged into the vortex overflow and separation is sharp until a lower underflow rate is reached where solids commence to accumulate at the apex outlet faster than they can be discharged. However, it should be noted that there is an increase in the point of separation or, i. e. in the settling rate of the equilibrium particle with the onset of the overloaded underflow.

It is noteworthy too that under the foregoing conditions of overloaded underflow discharges, the underflow outlet will never become plugged. This plugging conditions sometimes occurs with the underflow spigot of some gravitational classifiers. Consequently, it is a feature of this invention that simultaneously with separation, thickening of the underflow solids may be accomplished and the self-regulation effect will continue in spite of fluctuation in feed flow rates and feed solids concentration, as long as the underflow discharge is withdrawn at a rate sufficient to prevent an appreciable piling up of solids at the underflow outlet.

As an additional element to my invention, under certain below described conditions, a peripheral weir discharge with an overflow edge or the like may be provided at the top of the vessel to collect that portion of the body of liquid which may spill over the top of the vessel. Such a weir is useful for preventing waste of liquid suspension when abnormal surges of feed flow rates occur to such an extent that the liquid level rises above the top of the vessel. In such case the liquid suspension is collected in the weir discharge and returned to the feed system for recirculation. It is important to note that the self-regulating effect is still operative under these conditions. In all separating operations where a minimum separation point is not necessary, and where process liquid containing solids having settling rates greater than the equilibrium point can be tolerated or is desirable, the overflow edge of the weir may be so located in relation to the average normal operative liquid level at the surface of revolution that the liquid suspension may be continuously spilled over into the weir. While under this set of conditions the self-regulating features of the invention are still operative. I have observed, particularly under conditions of classification, that where a minimum separation point is desired any attempt to continuously spill a portion of the body of liquid over an overflow edge or the like results in a higher point of separation. The liquid flow to a peripheral weir discharge arises from the outer radius of the free vortex, which radius possesses the lowest centrifugal force of the outer spiral in the whirling body of liquid wherein all separations must be achieved. Consequently, a high percentage of liquid so discharged is not available for the creation of centrifugal forces within the vortex and therefore the size of separation will be increased. Furthermore, coarse particles will be spilled over into the weir.

The peripheral weir discharge is also useful to remove by continuously spilling some of the body of liquid over the top of the vessel floating feed particles which were not dragged into the overflow. Consequently, this invention with its self-regulating features is applicable to separation of sink-float separations. Furthermore, simultaneously with classification, this invention with its self-regulating features may also be applied to sink-float separations. Thus, in specific gravity separations with this invention the heavy particles if of varying particle size may be classified and the float particles separated from the coarse sink particles. In other words, coarse sink particles may be withdrawn in the underflow, the fine sink particles and some float particles may be withdrawn in the vortex overflow, and the remainder of the float particles appearing at the top of the whirling body of liquid may be swept into the weir discharge by the liquid spilling thereinto.

In applying this invention to sink-float separations wherein particles differed in shape, I have observed that particles of a generally flat or fibrouslike nature did not settle against the liquid drag currents in the body of liquid and thus tended to float. Some of these floatable particles were found in the vortex overflow while the remainder appeared at the top surface of the whirling body of liquid. By spilling liquid from the top of the body of liquid over the top of the vessel into a peripheral weir discharge or the like these floating particles can be collected and removed. In such a manner particles of floatable shape under these conditions are separated from particles of non-floatable shape while simultaneously the particles of non-floatable shape may be classified and, in addition, if desired the coarse particles fraction is thickened.

However, such floatable particles as are spilled over into the peripheral weir discharge will be in a liquid fraction containing some coarse sink solids in suspension, and of course, as indicated before, the size of separation and the specific gravity of separation will not be at a minimum because of the somewhat lowered centrifugal forces. Under some circumstances this can be tolerated, but in other situations it may be desired to obtain the float particles substantially free of coarse sink particles.

In those situations the invention may then comprise a float overflow means which comprises a vertical coaxially aligned, tubular section adapted to extend from or near the normal operative top surface level of the liquid body at the axis of revolution, and joining a conduit section extending therefrom into and through a surface of revolution and adapted to lie so that no part thereof is above the normal operative liquid level. Means may be provided with the float overflow means for adjusting the average normal operative flow rate therethrough. This float overflow means tends to maintain the vortex flow pattern and coarse particles will not be withdrawn through said means. In this embodiment the peripheral weir discharge may also be provided if the foregoing conditions arising from the inclusion of such can be tolerated. In such case the float particles may possibly be classified with the coarse float particles being continuously spilled over into the weir, along with coarse sink particles, and the fine float particles being withdrawn through the float overflow means. This embodiment is likewise characterized by the self-regulating features.

Under operative conditions the point of separation is noticeably effected by liquid turbulence created about the conduit sections of the float and vortex overflow means. This turbulent condition can be minimized by streamlining the horizontal sections of the overflow means. Likewise, turbulent effects due to wall friction have been noticed. However, all wall friction can be minimized by means of a smooth, constant, unobstructed surface of revolution with any taper therein being gradual.

It is an advantage of this invention that abrasive effects are at a minimum. Abrasion has been a difficult problem with hydrocyclones (particularly at the apex thereof) in certain applications. However, because of the much lower solids velocity in the underflow stream of the invention, abrasion will be at a minimum.

It is another advantage of this invention that the overflow discharges have sufficient potential energy to be useful in impelling them throughout the process or to waste.

Test work has also shown that it is another feature of this invention that much sharper separations can be obtained thereby than in gravitational separators and without additional power requirements as in conventional hydrocyclones.

This invention affords another advantage in that the apparatus thereof may be utilized as a storage space for process waters while simultaneously carrying out separations. It is in this context that the peripheral weir becomes useful for spilling over some of the body of liquid for the purpose of supplying process water.

This invention may be embodied in several specific forms without departing from the spirit or essential characteristics thereof. Therefore, the present embodiment is illustrative and not restrictive since the scope of the invention is defined by the appended claims rather than by the description preceding them, and all changes that fall within the metes and bounds of the claims, or of forms that are their functional as well as cooperative equivalents, are therefore intended to be embraced by those claims.

Reference is now made to the accompanying drawings.

Figure 2a is a side view of a detachable apex section showing a smaller outlet diameter for adjusting the average normal rate of flow therethrough.

Figure 3 is a cross-sectional view taken at the line 3—3 of Figure 2.

Figure 4 is a side view of the vortex overflow means taken along the line 4—4 of Figures 2 and 3.

Figure 5 is a diagrammatic side view of the apparatus of Figure 1 with the addition of a peripheral weir discharge.

Figure 1:
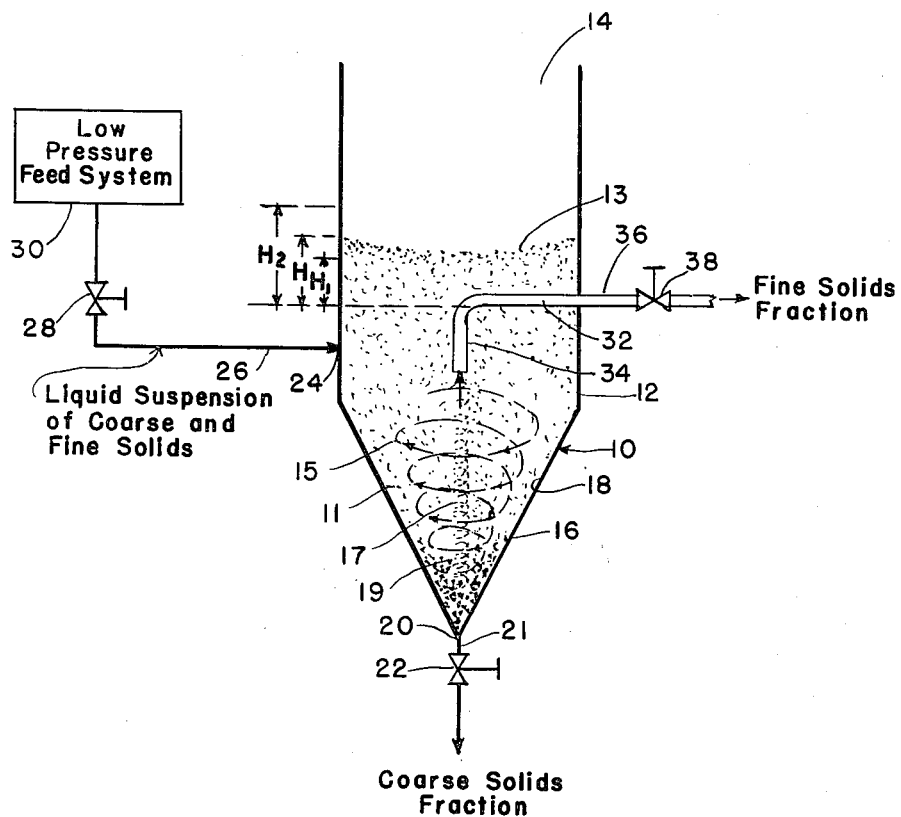
Figure 1 is a diagrammatic functional side view of a preferred embodiment of my invention for the separation of particles suspended in a liquid medium.

More specifically, referring to Figure 1, the apparatus shown comprises a vessel 10 adapted to contain a free whirling body of liquid 11. The vessel comprises a cylindrical chamber 12 open to the atmosphere at the top 14 thereof, and at the bottom subtended without obstruction by a conical chamber 16. It will be observed that horizontally the interior of the vessel is radially symmetrical whereby a surface of revolution 18 is presented, the axis of which coincides with the vertical center line of the vessel. Vertically, while at least the lower portion of the vessel is conically shaped, the surface of revolution 18 is smooth and unobstructed. The conical chamber is provided at the bottom thereof with underflow withdrawal means which comprise outlet 21 and an average flow rate adjustment means 22. Feed supply means comprise a conduit 26 tangentially entering the cylindrical chamber to terminate at the feed inlet 24 in the surface of revolution. Feed inlet 24 is arranged to lie at a level which is continuously below the lowermost operative liquid level. Conduit 26, preferably provided with means for adjusting the average normal operative rate of flow therethrough communicates with a low pressure feed supply system 30. Vortex overflow means 32 is provided which comprises a vertical tubular section or vortex finder 34 coaxially aligned with the axis of revolution and joined at the upper end thereof to a horizontal conduit section 36. The vortex finder extends downwardly to a level at or near the level of the feed inlet 24. The conduit section, extending horizontally from where it joins the vortex finder through and beyond the wall of the cylindrical chamber 12 is also provided with means 38 for shutting off the flow therethrough at the commencement of operation to let the vessel fill up to the average normal operative liquid level and, if desired, for adjusting the average normal operative rate of flow therethrough. It is to be realized, however, that the average normal operative rate of vortex overflow can also be adjusted by a suitable dimensioning of the vortex overflow means.

If it is desired to discharge from the apex outlet 21 directly into the atmosphere it is required that the horizontal conduit section 36 be arranged to lie so that for continuous operation the lowermost average liquid level under operative conditions will not fall below the lowermost level of the interior of the conduit. In this case gravity flow is depended upon for the withdrawal of vortex overflow. On the other hand, if the apex outlet 21 is submerged during operation, then all that is required for continuous operation is that the inlet to the vortex finder 34 be arranged at a level so that it will continuously be submerged at any operative liquid level. Here a siphon effect is relied upon primarily for the withdrawal of vortex overflow. A siphon effect can not be utilized in the first instance, except possibly during conditions of overloaded underflow discharges, because of the presence of the central air core or column.

Under operative conditions, the liquid feed suspension of the mixture of solids to be separated is conveyed from the low pressure feed system 30 through the feed conduit 26 and forcibly and continuously introduced tangentially into the vessel 10 whereby a whirling body of liquid 11 with a top concave surface 13 is established and maintained. The average normal operative rate of flow of feed suspension into the vessel 10 is adjusted by the adjusting means 28, to be at a rate sufficient to maintain the concave surface of the body of liquid 11 at an average level above the inlet to the vortex finder 34 and also the feed inlet 24 so that under operative conditions the level at the cylindrical wall of the top concave surface 13 will not fall below the top level of feed inlet 24 and that level of lowest portion of the top concave surface at the axis of revolution will not fall below the inlet to the vortex finder 34 during fluctuation in feed flow rates. The feed pressure must be sufficient to establish and maintain a free vortex in the body of liquid 11 whereby centrifugal forces are developed. It will be noticed that under these conditions the free vortex comprises two concentrically disposed spiralizing flow paths. One flow path 15 spiraling adjacent the surface of revolution downwardly toward the apex of the conical section is designated herein as the underflow stream. A second flow path 17 spiraling in the same rotational direction but upwardly about the axis of revolution is referred to herein as the vortex overflow stream. The radius of revolution of the underflow stream is determined by the vertical shape of the surface of revolution whereas the radius of revolution of the overflow stream is primarily determined by the radius of the vortex finder. As before indicated, with the exception of overloaded discharge conditions, if the outlet 21 is open to the atmosphere a column or core of air surrounding the axis of revolution and extending from the outlet 21 into the vortex finder will be observed within the inner spiral 17. This air core is a characteristic of the free vortex. However, outlet 21 is shown in Figure 1 with a conduit leading therefrom and so the air core will not be present under operative conditions.

Upon introduction of the feed suspension into the body of liquid 11, the suspension tends to follow the outer spiral 15. Solids particles under the influence of both the force of gravity and the centrifugal forces developed by the spiraling liquid in the underflow stream 15 tend to settle towards the surface of revolution. Simultaneously some of the liquid tends to be displaced towards the axis of revolution and, because of the continuous withdrawal of liquid through the vortex overflow withdrawal means 32, liquid continuously flows from the outer spiral 15 into the vortex overflow stream 17 at a velocity sufficient to drag along solids having a lower settling velocity. With the underflow stream being withdrawn through the underflow withdrawal means 20 and the overflow stream being withdrawn through vortex overflow withdrawal means 32, a separation of particles on the basis of settling rates is accomplished. Thus, taking classification as an example, the underflow stream from the vessel will comprise a coarse solids fraction whereas the vortex overflow stream will comprise a fine solids fraction.

Furthermore, under these conditions, the point of separation and the sharpness of separation will be substantially uneffected by normal operative fluctuation of feed flow rates. Upon a decrease in feed flow rate the height of the lowest portion of the concave surface 13 above the inlet to the vortex finder 34 will fall from a level H to level $H_1$. In so doing the potential energy stored therein will be released as the level falls and be utilized in bolstering up the declining centrifugal forces. Thus, the centrifugal forces will decrease at the same rate as the liquid drag forces sweeping particles into the overflow stream and the mesh of separation remains substantially constant. Upon an increase in feed flow rate, some of the added liquid energy will be utilized in raising the height of the lowermost portion of concave surface 13 above the inlet to the vortex finder 34 and from level H to level $H_2$ and thus it is converted into potential energy. The remaining energy will be utilized in increasing the strength of the centrifugal forces. Consequently, centrifugal forces will increase at the same rate as the liquid drag forces sweeping particles into the vortex overflow stream.

Figure 9:
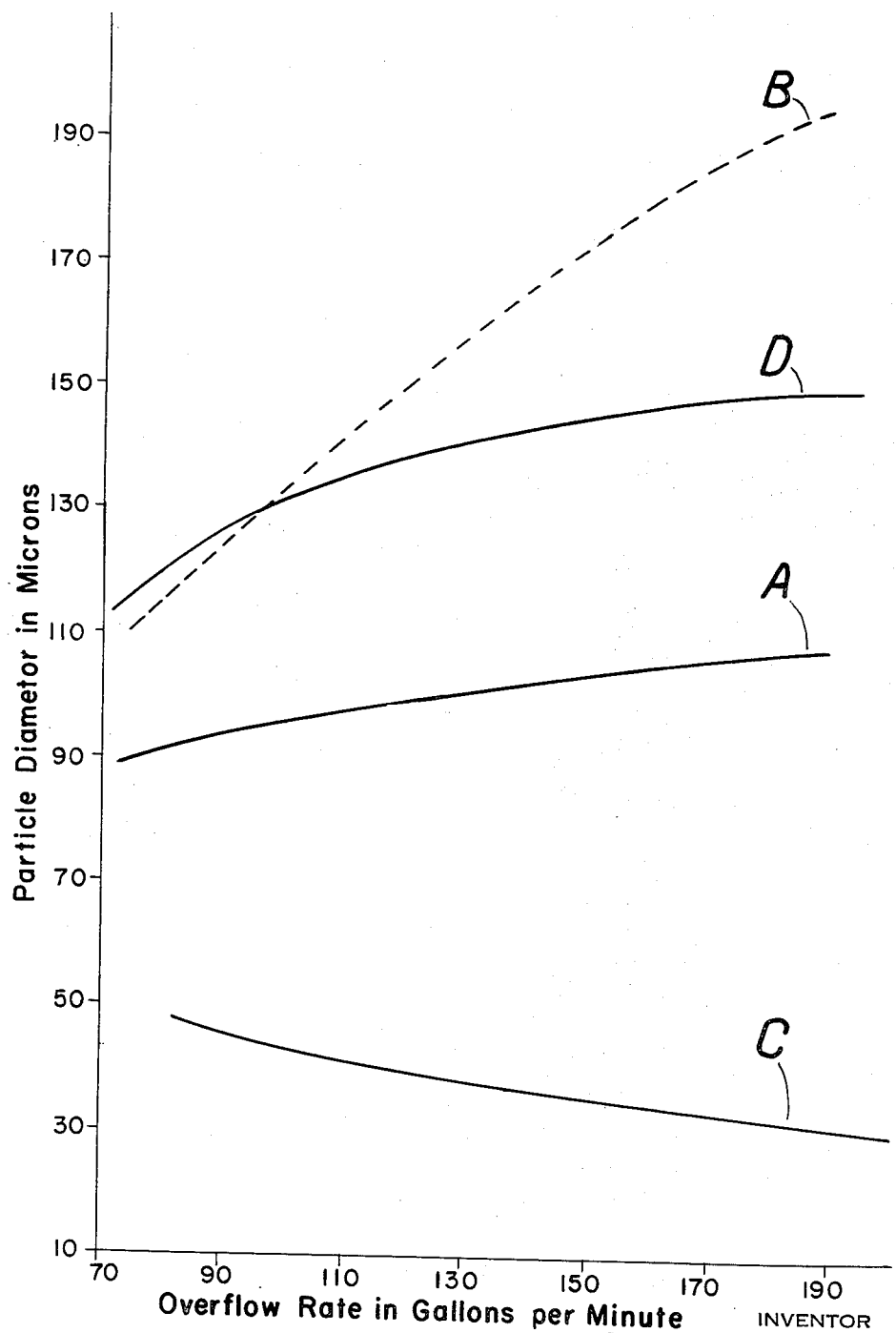
Figure 9 is a graph showing the effect of increased overflow rates on the point of separation and on the sharpness of separation when the teachings of this invention are applied for example, to classification operations.

This self-regulating feature in classification, for example, is graphically illustrated in Figure 9 to which reference is now made. The abscissa of the graph represents the overflow rate in gallons per minute whereas the ordinate represents the particle diameter measured in microns. Curves A, B and C illustrate the effect of increase in overflow rate upon equilibrium particle size which is defined as the diameter of the particle in microns which is in equilibrium with the fluid currents at the critical separation point within the body of liquid 11 (theoretically, the particle size whose settling velocity is exactly equal to and opposite that of the radial velocity of the liquid at the radius separating the inner and outer spirals of the free vortex within the body of liquid under the conditions of operation). Curve A is representative of the effect thereof in this invention whereas curve B is plotted from data obtained in gravitational classification. Curve C is plotted from data obtained in centrifugal classification in a hydrocyclone. Curve D illustrates the effect of an increase in overflow rate on the diameter of separation in applying the teachings of this invention, the diameter of separation being defined as the diameter in microns at which 1.5% (by weight) of the overflow solids is greater. The diameter of separation is one indicia of the sharpness of separation. It will be observed that in comparison to curves B and C, curve A is substantially constant thus indicating that with an increase in overflow rates in this invention there is self-regulation. Curves A and D tend to move upwardly but at a much smaller rate than curve B and the rate of downward movement of curve C, which indicates that under the testing conditions the self-regulating effect was not at a maximum. However, both curves appear to be asymptotic in nature. The tendency to increase exhibited by curves A and D is probably due to wall friction. Because of the relatively small liquid forces involved, a relatively high percentage of liquid energy is probably consumed in overcoming wall friction. Thus a smaller percentage of liquid energy is converted into centrifugal forces so that the changing drag forces can not be entirely offset. Consequently, as is necessary for maximum self-regulating effect, wall friction must be reduced to a minimum. This emphasizes the need for a smooth unobstructed surface of revolution, and for a gradual and gentle taper of the surface of revolution.

As indicated in the foregoing, there is some self-regulation in regards to the point of separation and the sharpness of separation under conditions of fluctuations in feed solids concentration. However, this particular self-regulation effect appears to decrease with an increase in feed solids concentration because of increased hindered settling conditions within the whirling body of liquid 11.

Both of these self-regulating features are applicable at any normal operative underflow solids concentration up to that concentration where the underflow commences to become overloaded. At this concentration the settling rate of the equilibrium particle tends to increase, although separation still remains sharp. From this concentration up to the concentration at which solids accumulate at the outlet 21 at a rate faster than they can be withdrawn there is some degree of self-regulation in respect to the equilibrium particle and separation remains relatively sharp. During overloaded underflow discharge conditions, while maintaining a withdrawal rate higher than that at which the solids commence to accumulate faster than they can be withdrawn, particles of the highest settling velocities are not withdrawn in the overflow stream. This is due to the comparatively low centrifugal forces involved in this separation. In other words, the centrifugal forces are not sufficient to "twist off" the inner spiral 17 at the apex of the conical chamber 10 and thus severely impair the solids discharge.

Because of the fact that the apex outlet 21 will not plug up with underflow solids in this range of underflow withdrawal rates, it is apparent that the invention with its self-regulating feature can be applied not only to separation but simultaneously to thicken the underflow solids fraction.

Figure 2:
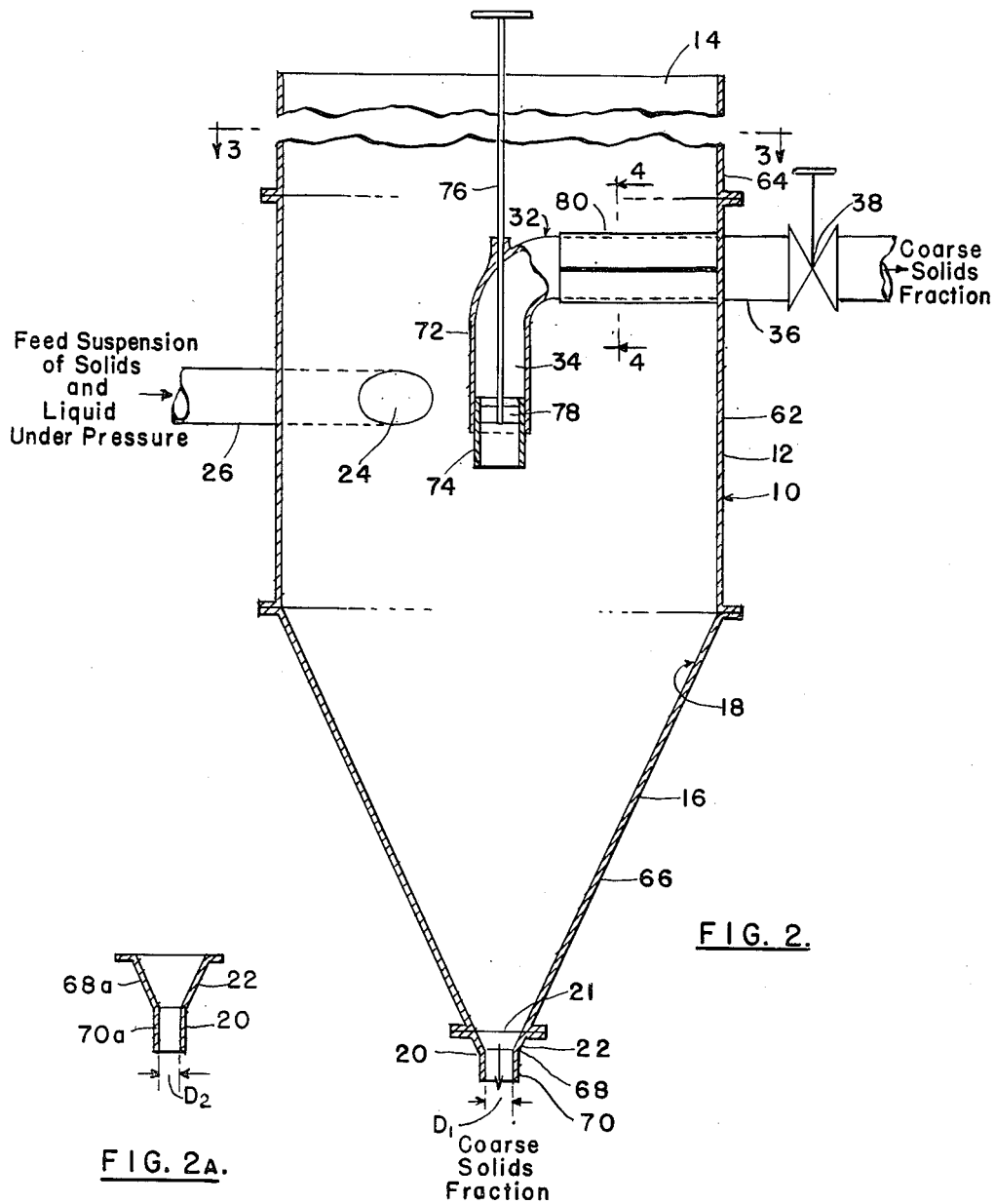
Figure 2 is a more detailed side view of the apparatus diagrammatically illustrated in Figure 1.

Turning now to Figures 2, 2a, 3 and 4 it will be noticed that the apparatus illustrated is substantially the same as that of Figure 1, except that the apex outlet of Figure 2 is shown open to the atmosphere. It will be observed that the cylindrical chamber 12 comprises at least two sections, a lower section 62 and an upper section 64. Upper section 64 is replaceable and may be of any height predetermined on the basis of the highest normal operative liquid level at the cylindrical chamber wall. The conical chamber 16 also comprises at least one section. Here however, two sections are shown, top section 66 and the detachable and replaceable apex section 69. Apex section 68, actually a part of the underflow outlet means 20, comprises an outlet 21 of a fixed diameter $D_1$ subtended by a tubular spray guard 70. For adjusting the flow rate to a lesser value, the apex section 68a illustrated in Figure 2a may be inserted in place of the section of Figure 2, the conical section of Figure 2a having a smaller outlet diameter $D_2$. However means other than interchangeable apex section, for controlling the rate of flow through the outlet of the apex section, may be utilized. It will be observed that the vortex overflow withdrawal means comprises a vortex finder 34 having an upper stationary member section 72 concentrically disposed about a lower adjustable sleeve member 74 movable in an up and down direction inside of the stationary member section. Adjusting means 76 connected to the adjustable sleeve by spokes 78 are provided for moving the adjustable sleeve 74 up or down in order to adjust the level of inlet to the vortex finder in respect to the feed inlet 24.

I have observed that under operative conditions, there is a substantial amount of turbulence in the liquid body due to the horizontal section 36. This turbulence I have discovered is detrimental to the point of separation and to the sharpness thereof. Therefore, it is preferred that the horizontal section 36 be streamlined to minimize this turbulence. This streamlining may also be obtained by shrouding the entire horizontal length of the conduit section within the vessel 10 by an air foil 80, which air foil may be of any standard design. One type of air foil that may be used is illustrated in Figure 4.

In Figure 5 it will be observed that an additional element has been added to the vessel illustrated in Figure 1. It will be noticed that at the top 14 of the vessel 10 a peripheral weir 40 having an overflow edge 42 is provided. This weir is added to the vessel 10 for several purposes. One purpose is to act as a safety device; in other words, under abnormal surges of feed flow rates into the vessel the liquid level at the cylindrical chamber wall may rise to a height $H_2$ above the top 14 of the cylindrical chamber. To prevent the wasting of liquid suspension peripheral weir 40 may be provided. Under such circumstances the collected suspension is returned to the low pressure feed system 30 by means of a conduit 44.

Under some circumstances it may be desired to continuously return process water back to the feed supply system 30, or it may be desired to use such process water elsewhere. Under such conditions the height of the overflow edge 42 is adjusted in relation to the average normal operative liquid level of the wall of the cylindrical chamber 12 so that there is continuously spilled over the overflow edge 42 a fraction of the liquid suspension. However, I have observed that such continuous spilling over tends to reduce centrifugal forces within the free vortex and distort the flow pattern therein, thus raising the point of separation and reducing the sharpness of separation. Furthermore, particles of greater settling characteristics than the equilibrium particle are continuously spilled over with the liquid into the launder 40.

The peripheral weir is also useful to remove float particles from the concave surface 13 which were not withdrawn through the vortex overflow means 32. In this case, conditions are arranged so that the overflow edge 42 is sufficiently below the average normal operative liquid height of the surface 13 to permit float particles to be floated off the surface and over the overflow edge 42 into the weir. However, the same detrimental effects as before noted are present.

Figure 6:
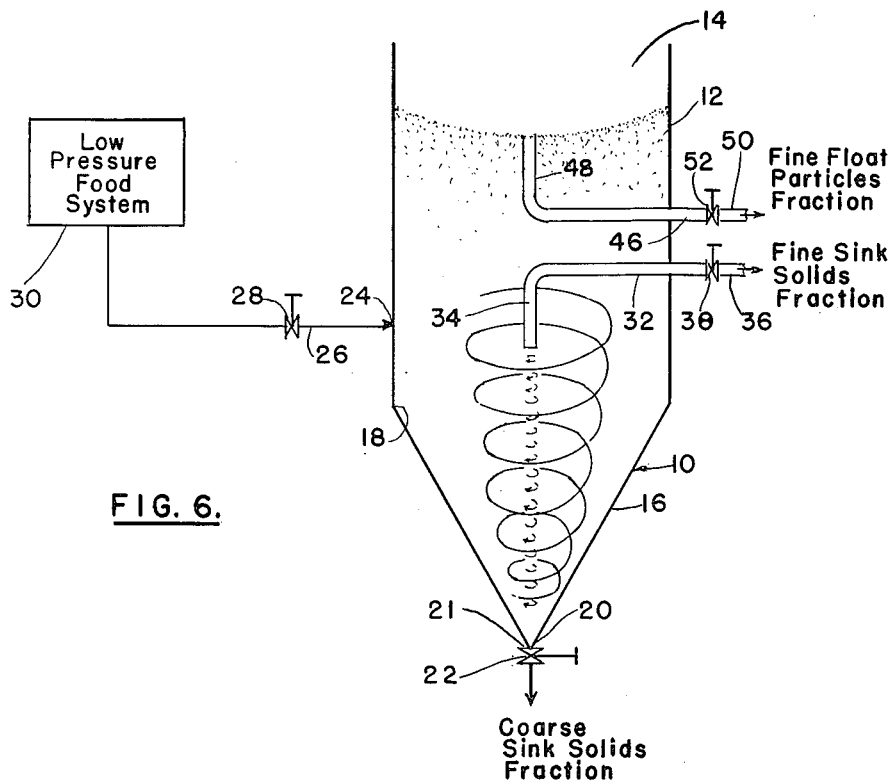
Figure 6 is a diagrammatic functional side view of the apparatus of Figure 1 with the addition of a central float particle discharge means.

An apparatus especially adapted for the removal of float particles is shown in Figure 6. It will be observed that within the vessel 10, there is provided float discharge means 46 which comprise a vertical tubular section coaxially aligned with the axis of revolution and joined to a horizontal section 50. The tubular section 48 extends from a level below that of the surface level about the axis of revolution of the body of liquid 11 downwardly to join the horizontal section 50. Horizontal section 50 extends from where it joins the tubular section 48 outwardly to and through the wall of the cylindrical chamber 12. If desirable the horizontal section 50 may also comprise flow rate control means 52 for adjusting the average normal operative rate of flow therethrough, although by proper dimensioning of the float discharge means, the average normal operative flow rate may be adjusted. In operation, in sink-float separations the particles to be separated are introduced through the feed inlet at an average flow rate sufficient to cause liquid to be continuously spilled over the overflow edge 42 even though there may be normal operative fluctuations thereof, and of the same pressure conditions as before described in reference to classification operations. Under the influence of both centrifugal forces and gravity forces the particles tend to settle towards the surface of revolution 18. However, because of the continuously flowing vortex overflow, the liquid is swept into the inner spiral 17 at a velocity greater than the settling velocity of the float particles. As a result the sink particles are withdrawn in the underflow stream 15 while float particles are withdrawn in the vortex overflow stream 17. However, because of the low centrifugal forces involved float particles may escape being withdrawn through the vortex overflow means 32 and will spiral upwardly to the top surface 13 of the body of the liquid 11, congregating at the surface about the axis of revolution. These float particles are then withdrawn through the float discharge means 46. Under these conditions, the free vortex is maintained without substantially the detrimental effects experienced with the launder above.

Figure 7:
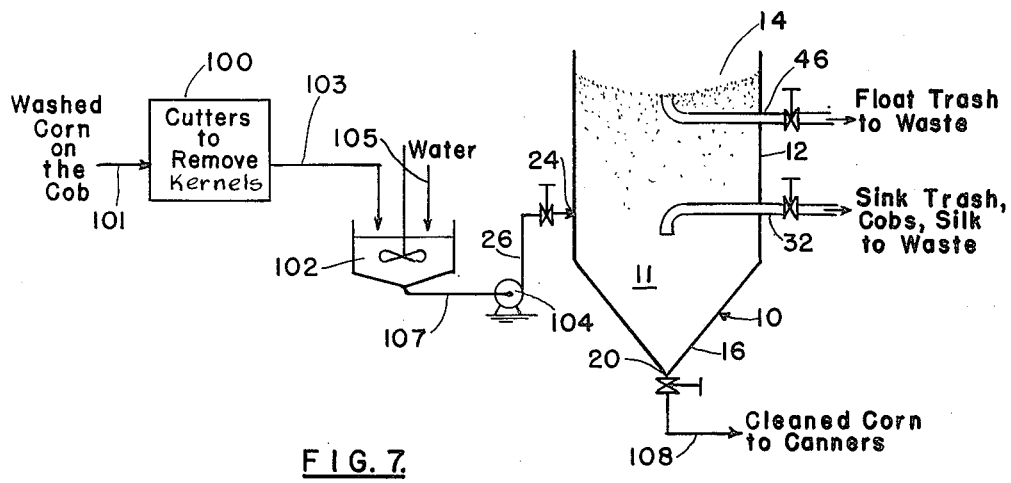
Figure 7 is a flowsheet of a process wherein the method of separation disclosed in Figure 6 is especially applicable.

As an example of the application of the apparatus of Figure 6, reference is made to Figure 7 wherein a process for obtaining the corn kernels from corn cobs is shown. It will be observed that corn on the cob is introduced via a conduit 101 into the kernel removing station 100 where kernels are removed from the corn cob by cutting means. From this station there is discharged into conduit 103 a mixture of kernels (the desired product), cobs, silk, and other trash-like materials. This mixture flows through conduit 103 into an agitation station 102 wherein water is added and the mixture is thoroughly agitated to suspend the mixture in the liquid. From the agitation station the liquid suspension is conveyed through conduit 107 to a low pressure pump 104 from where the suspension is forcibly and continuously impelled through conduit 26 to be tangentially introduced into the vessel 10 from feed inlet 24 at a flow rate and pressure disclosed in the foregoing description. Within the whirling body of liquid 11 simultaneous gravitational and sink-float separation occurs so that there is discharged into the conduit 108 from the underflow outlet 21 clean corn kernels whereas through vortex overflow withdrawal means 32 there is discharged to waste sink trash particles and floatable particles such as cobs and silk. From the float discharge means 46 the remainder of the trash and cobs is discharged to waste. The clean corn is then conveyed by conduit 108 to the canning operation without further cleaning.

Figure 8:
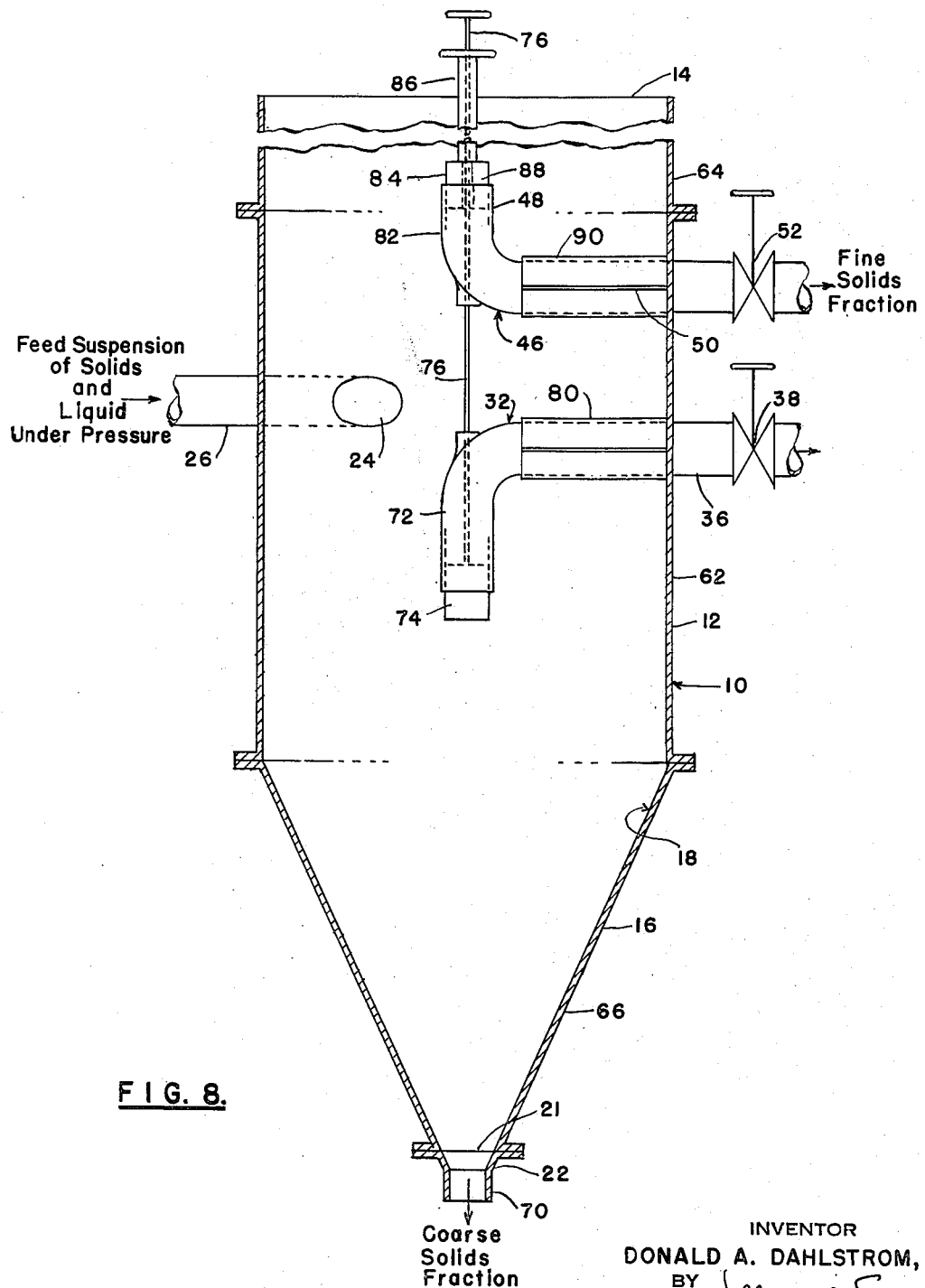
Figure 8 is a more detailed side view of the apparatus diagrammatically illustrated in Figure 6.

Turning now to Figure 8 for a more detailed illustration of the apparatus described in reference to Figure 6 it will be observed that the apparatus essentially comprises the same structure as that of Figure 2 but with the additional float discharge means. It will be observed that the vertical tubular member 48 comprises a lower stationary member section 82 concentrically disposed about an upper adjustable sleeve member 84 slidable upwardly and downwardly inside 82. Adjusting means 86 are attached to the sleeve member 84 by way of spokes 88. By manipulating the adjusting means 86 the height of the tubular member 48 may be adjusted in relation to the liquid level about the edge of the inlet thereto. To minimize turbulence about the horizontal conduit section 50 an air foil similar to that illustrated in Figure 4 may be disposed about the horizontal section 50, or the horizontal conduit section 50 may itself be streamlined.

Although it is not shown it will be realized that a peripheral weir having an overflow edge as well as a discharge conduit therefrom may also be provided with this embodiment, if desired, for the same purposes as set forth in the foregoing embodiments. It also might be used to remove the coarse float particles in which conditions arranged so that there is a continuous spilling over of liquid and thus float particles into the launder. In this embodiment the float particle discharge means 46 can be used to remove the fine float particles. It should be realized, however, that some coarse sink particles will also be found in the peripheral weir discharge, and a minimum classification point cannot be obtained.

*Example 1*

In accordance with the requirements of this invention as set forth in the preceding portion of the specification, an apparatus of the type described was constructed with the dimensions thereof chosen as follows. The cylindrical section had a diameter of 30" while the conical section possessed a large included angle of 60°. The feed nozzle was a standard 4" pipe entering the cylindrical section tangentially, with its center line 17.5" below the top of the cylindrical chamber. The conical section was flanged near the apex to permit the insertion of different 60° apex outlet section with outlet diameters ranging from 5/8" to 1¾". Four inch copper tubing was used for the vortex overflow means, the inlet to which is located at the cylindrical center line on a plane level to the bottom of the feed nozzle. A 90° elbow joined the vortex finder to a horizontal conduit passing through the cylindrical chamber. The center line of the horizontal conduit was 8½" above that of the feed nozzle. An air foil of galvanized iron was constructed with a fineness ratio, length to maximum diameter, of two. The air foil enveloped the horizontal conduit from the junction at the cylindrical chamber wall to the edge of the 90° elbow.

The vessel was constructed with a peripheral weir located 7" above the top of the vortex overflow horizontal conduit. The weir discharge was used at high feed rates but it was found that it contained coarser solids than the regulation vortex overflow stream. Accordingly, a 2' extension was added to the cylindrical wall making a launder discharge unnecessary.

The apparatus was then operated according to the requirements of this invention for the purpose of classifying a water suspension of ground agricultural dolomite of 2.83 specific gravity. All particles were very uniform in specific gravity and less than 1% were coarser than 20 mesh. The size of distribution of the feed solids is set forth as follows:

| Size Fraction | Wt. Percent Range | Wt. Percent Average |
|---|---|---|
| + 20 Mesh U. S. Std | 0.5–0.8 | 0.6 |
| 20 x 40 | 30.8–38.0 | 34.4 |
| 40 x 60 | 18.1–20.8 | 19.4 |
| 60 x 100 | 6.5–10.2 | 8.3 |
| 100 x 140 | 2.9–3.7 | 3.3 |
| 140 x 200 | 2.6–3.6 | 2.9 |
| −200 | 29.1–33.8 | 31.1 |

The solids were charged to a 250 gallon open tank equipped with a high speed mixer and water was added to obtain a liquid suspension. A slurry pump impelled the suspension into the feed conduit to the vessel through a hand operated throttling gate valve for control of the feed flow rate. The overflow, underflow, and weir discharges were returned to the slurry tank through sheet metal conduits or launders. Before any analyses or rate samples were taken the system was allowed to pump for several minutes to attain equilibrium. Samples were then taken from all discharge streams to secure data on size distribution and solids concentrations. Rates were determined by collecting a discharge stream in a weighing tank for a timed interval. Solid concentration and size distribution of the feed stream were obtained by calculations based on the data obtained from an analysis of the discharge streams.

Some of the data obtained are set forth as follows:

| | Test 1 | Test 2 | Test 3 | Test 4 | Test 5 | Test 6 |
|---|---|---|---|---|---|---|
| Slurry Rate, G. P. M.: | | | | | | |
| Feed | 85.5 | 142.9 | 157.6 | 165.7 | 159.1 | 162.3 |
| Vortex Overflow | 71.0 | 121.0 | 132.0 | 127.2 | 121.2 | 148.8 |
| Underflow | 14.5 | 21.9 | 25.6 | 38.5 | 37.9 | 13.5 |
| Ratio of Vortex Overflow Rate to Underflow Rate | 5.0 | 5.5 | 5.2 | 3.3 | 3.2 | 11.0 |
| Solids Concentration, Wt. Percent: | | | | | | |
| Feed | 23.5 | 23.4 | 24.5 | 22.0 | 31.35 | 19.10 |
| Vortex Overflow | 9.2 | 9.16 | 9.31 | 9.03 | 10.98 | 9.74 |
| Underflow | 66.0 | 69.0 | 69.4 | 52.0 | 69.6 | 75.7 |
| Solids Rate, Tons/Hour: | | | | | | |
| Feed | 5.91 | 9.80 | 11.42 | 10.56 | 15.50 | 8.81 |
| Vortex Overflow | 1.73 | 2.92 | 3.26 | 3.04 | 3.55 | 3.85 |
| Underflow | 4.18 | 6.88 | 8.16 | 7.52 | 11.95 | 4.96 |
| Diameter of Separation, Microns | 131 | 111 | 142 | 145 | 167 | 141 |
| Equilibrium Particles, Microns | 88 | 94 | 92 | 104 | 108 | 129 |
| Liquid Level above Bottom of Horizontal Overflow Section, Inches | 4½ | 12 | 17 | ------ | 17 | 17 |

Slurry Rate, G. P. M.: Test 7
  Feed .................................... 200.0
  Vortex overflow ......................... 133.3
  Weir overflow ........................... 47.0
  Underflow ............................... 19.7
  Ratio of vortex overflow rate
    to underflow rate ..................... 6.8
Solid concentration, wt. percent:
  Feed .................................... 16.05
  Vortex overflow ......................... 7.71
  Weir .................................... 6.93
  Underflow ............................... 64.5
Solid rate, tons/hour:
  Feed .................................... 8.93
  Vortex overflow ......................... 2.70
  Weir .................................... 0.85
  Underflow ............................... 5.38
Diameter of separation (microns):
  Vortex overflow ......................... 197
  Weir overflow ........................... 295
  Composite ............................... 222
  Without weir discharge and overflow
    at same capacity ...................... 149
Equilibrium particle size (microns) ....... 118
Equilibrium particle size (microns) without weir
  discharge and overflow at same capacity .. 108

It will be observed from a comparison of tests No. 1, 2 and 3 that at substantially the same feed solids concentration and at substantially the same ratio of overflow rate to underflow rate, the equilibrium particle size remained substantially the same with only a slight change in the diameter of separation, even though there were different feed flow rates. Thus, the point of separation, the equilibrium particle, and the sharpness of classification remain substantially constant, indicating that the invention presents a self-regulating feature in regards to variations in feed flow rates.

From a comparison of tests No. 4 and 5 it will be observed that at about the same feed solids flow rate and approximately the same ratio of overflow rate to underflow rate, fluctuations in feed solids concentration have but a slight effect on the equilibrium particle size whereas the self-regulating effect on the diameter of separation was not as great, thus, the invention presents another self-regulating feature in regards to variances in feed solids concentration.

It will be observed from tests 1 through 5 that the underflow solids concentration varied without an appreciable effect on the diameter of separation or on the equilibrium particle size. However, in test 6 an overloaded underflow discharge was obtained and on comparison of this test with the tests 1 through 5 it will be observed that while the size of the equilibrium particles increased the diameter of separation remained about the same showing that none of the concentrated solids were being drawn into the vortex overflow and also indicating a sharp classification as well.

Test 7 is presented to show results with and without a peripheral weir. It will be observed that with a peripheral weir the equilibrium particle size increased and that the diameter of separation in relation to the vortex overflow was greater, thus indicating that where a minimum classification point is desired the peripheral weir should not be used. It will also be observed from the diameter of separation of the liquid discharge that the liquid discharge contained a substantial amount of coarse solids.

It will be observed too from the data relating to solids rate and tons per hour that the capacity of the apparatus is high. Also, it will be noticed from the data relating to the liquid level above the vortex overflow means that the liquid level above the feed pipe can be held to less than three feet. From this it is obvious that power requirements are low.

Some representative examples of the application of this invention are set forth as follows:

In classification the invention is applicable to many different industrial processes and methods. For example, it is applicable in coal washing plants to remove by classification the fine coal content of the fine coal bearing process streams. The underflow, the fine coal, may be simultaneously thickened. At the same time it provides a convenient storage space for process waters. The invention is also applicable to closed circuit grinding so commonly used in the beneficiation of ores. Solids from a comminuting station are classified as taught by this invention with the coarse solids being recycled until ground to fine solids, and the fine solids being discharged to process. Because of the irregularity of solids flow rates in the usual beneficiation process, the invention is of particular advantage here. Another application of the invention is in classifying sand from hydraulic mining operations into a fine solids fraction and a coarse solids fraction which is simultaneously thickened. The fine solids fraction comprising fine sand and clay or slime is then deslimed in a conventional hydrocyclone. The fine sand is then thickened whereupon it is ready for use as a finished product. The thickened coarse solids fraction upon withdrawal from the classifier is ready for use as finished product. The self-regulating features of this invention are particularly applicable in this context in view of the fluctuating feed flow rates so commonly found in hydraulic mining.

The sink-float separation aspect of this invention is particularly applicable in the food industry. One application already set forth is in the removal of niblets or corn from corn cobs. Another application of this invention is in the processing of peas. Peas to be separated into different quality fractions are injected by means of a venturi or the like into a brine solution of 1.07 to 1.09 specific gravity and the mixture is then introduced into the preferred sink-float apparatus embodiment of this invention. The younger more tender peas tend to float while the overripe and pulpy peas tend to sink. With this invention the float peas are withdrawn through the vortex overflow means and the float overflow means as the premium product while the sink peas are withdrawn at the underflow as the lower quality product or as waste product.

I claim:
1. A continuous method for separating in a liquid medium a mixture of solids having different settling rates in that liquid into at least an underflow comprising solids of higher settling rates and an overflow comprising solids of lower settling rates which comprises establishing and maintaining a vertically radially symmetrical, free whirling, body of the liquid, that has a vertical axis of revolution and at least at the bottom portion thereof having a gradually decreasing radius of revolution; continuously introducing together the liquid and the mixture of solids tangentially to the radially symmetrical periphery into the body near the top surface thereof at a pressure sufficient to whirl the body as a free vortex to thereby create centrifugal forces for settling solids of higher settling rates, and at rates of flow sufficient to always maintain the top surface of the body above the point of introduction; withdrawing liquid as vortex overflow from a region below the top surface of the body about the axis of revolution substantially opposite the point of introduction at a rate lower than the rate of introduction but sufficient to create liquid drag forces to oppose settling forces in the body whereby solids of lower settling rates are segregated and withdrawn in the vortex overflow; settling by centrifugal forces and the force of gravity the solids of higher settling rates; withdrawing as underflow liquid and the settled solids of higher settling rates from the bottom of the body at the point of minimum radius at a rate less than the said rate of introduction but greater than the rate of withdrawal at which solids of higher settling rates accumulate faster at the point of withdrawal than they are removed; and, during normal operative fluctuations in the rate of in- troduction, maintaining substantially the same point of separation and the sharpness of separation over the range of underflow withdrawal rates from the maximum rate to the rate at which the underflow becomes overloaded and over the range of underflow withdrawal rates from that at which the underflow becomes overloaded to that at which the solids of higher settling rates accumulate faster than they are withdrawn, by varying the average level of at least a portion of the top surface of the body, which is unobstructedly in contact with the atmosphere, in direct proportion to the said fluctuations.

2. The continuous method according to claim 1 with an additional step which comprises withdrawing liquid and solids from the top surface of the body at the circumferential periphery thereof.

3. The continuous method according to claim 1 with an additional step which comprises withdrawing liquid and floating solids from the region of the top surface of the body of liquid about the axis of revolution.

4. The continuous method according to claim 1 with the additional steps which comprise withdrawing liquid and solids from the top surface of the body at the circumferential periphery thereof; and withdrawing liquid and floating solids from the region of the top surface of the body of liquid about the axis of revolution.

5. An apparatus for the hydraulic separation of a mixture of solids of different settling rates into at least an overflow fraction comprising solids of lower settling rates and an underflow fraction comprising solids of higher settling rates, which comprises a hollow chamber adapted to contain a free whirling body of liquid and solids by a hollow cylindrical section unobstructedly open at the top thereof and subtended at the bottom by an unobstructed conical section, the axis of radial symmetry of each section being vertically and coaxially disposed; inlet means for forcibly and tangentially introducing liquid along with the mixture of solids into the chamber at the periphery of the cylindrical section at a significant distance from the top thereof; a coaxial outlet at the apex of the conical section for the continuous discharge of said underflow fraction; and outlet means for the continuous discharge of said overflow fraction, which consists of a tubular section coaxially disposed in the cylindrical section of the chamber with the inlet thereto disposed in a region substantially opposite the feed inlet, and a conduit section joined to the tubular section and leading therefrom to the outside of the chamber together with float withdrawal means which comprise a vertical tubular section coaxially disposed in the cylindrical chamber, the inlet at the top end thereof being at an elevation near but below that of the top of the cylindrical chamber, and a conduit section joined to the bottom end of the tubular section and leading therefrom to and through the wall of the cylindrical chamber.

6. An apparatus for the hydraulic separation of a mixture of solids of different settling rates into at least an overflow fraction comprising solids of lower settling rates and an underflow fraction comprising solids of higher settling rates, which comprises a hollow chamber adapted to contain a free whirling body of liquid and solids by a hollow cylindrical section unobstructedly open at the top thereof and subtended at the bottom by an unobstructed conical section, the axis of radial symmetry of each section being vertically and coaxially disposed; inlet means for forcibly and tangentially introducing liquid along with the mixture of solids into the chamber at the periphery of the cylindrical section at a significant distance from the top thereof; a coaxial outlet at the apex of the conical section for the continuous discharge of said underflow fraction; and outlet means for the continuous discharge of said overflow fraction, which consists of a tubular section coaxially disposed in the cylindrical section of the chamber with the inlet thereto disposed in a region substantially opposite the feed inlet, and a conduit section joined to the tubular section and leading therefrom to the outside of the chamber together with a peripheral weir with an overflow edge disposed about the top of the cylindrical chamber, and discharge means therefrom; and a float withdrawal means comprising a vertical tubular section coaxially disposed in the cylindrical chamber, having an inlet at the top end thereof at an elevation near but below that of the top of the cylindrical chamber, and having a conduit section joined to the tubular section and leading therefrom to and through the wall of the cylindrical chamber.

7. An apparatus for the hydraulic separation of a mixture of solids of different settling rates into at least an overflow fraction comprising solids of lower settling rates and an underflow fraction comprising solids of higher settling rates, which comprises a hollow chamber adapted to contain a free whirling body of liquid and solids by a hollow cylindrical section unobstructedly open at the top thereof and subtended at the bottom by an unobstructed conical section, the axis of radial symmetry of each section being vertically and coaxially disposed; inlet means for forcibly and tangentially introducing liquid along with the mixture of solids into the chamber at the periphery of the cylindrical section at a significant distance from the top thereof; a coaxial outlet at the apex of the conical section for the continuous discharge of said underflow fraction; and outlet means for the continuous discharge of said overflow fraction, which consists of a tubular section coaxially disposed in the cylindrical section of the chamber with the inlet thereto disposed in a region substantially opposite the feed inlet, and a conduit section joined to the tubular section and leading therefrom to the outside of the chamber, wherein said conduit section of the vortex overflow means is streamlined from the wall of the cylindrical chamber to where it joins the tubular section.

8. An apparatus for the hydraulic separation of a mixture of solids of different settling rates into at least an overflow fraction comprising solids of lower settling rates and an underflow fraction comprising solids of higher settling rates, which comprises a hollow chamber adapted to contain a free whirling body of liquid and solids by a hollow cylindrical section unobstructedly open at the top thereof and subtended at the bottom by an unobstructed conical section, the axis of radial symmetry of each section being vertically and coaxially disposed; inlet means for forcibly and tangentially introducing liquid along with the mixture of solids into the chamber at the periphery of the cylindrical section at a significant distance from the top thereof; a coaxial outlet at the apex of the conical section for the continuous discharge of said underflow fraction; and outlet means for the continuous discharge of said overflow fraction, which consists of a tubular section coaxially disposed in the cylindrical section of the chamber with the inlet thereto disposed in a region substantially opposite the feed inlet, and a conduit section joined to the tubular section and leading therefrom to the outside of the chamber, together with a peripheral weir with an overflow edge disposed about the top of the cylindrical chamber, and discharge means therefrom; and a float material withdrawal means comprising a vertical tubular section coaxially disposed in the cylindrical chamber, having an inlet at the top end thereof at an elevation near but below that of the top of the cylindrical chamber, and having a conduit section joined to opposite end of the tubular section and leading therefrom to and through the wall of the cylindrical chamber; with the conduit section of both overflow means being streamlined from the cylindrical wall to where each joins its respective tubular member.

9. An apparatus for the hydraulic separation of a mixture of solids of different settling rates into at least an overflow fraction comprising solids of lower settling rates and an underflow fraction comprising solids of higher settling rates, which comprises a hollow chamber adapted to contain a free whirling body of liquid and solids by a hollow cylindrical section unobstructedly open at the top thereof and subtended at the bottom by an unobstructed conical section, the axis of radial symmetry of each section being vertically and coaxially disposed; inlet means for forcibly and tangentially introducing liquid along with the mixture of solids into the chamber at the periphery of the cylindrical section at a significant distance from the top thereof; a coaxial outlet at the apex of the conical section for the continuous discharge of said underflow fraction; and outlet means for the continuous discharge of said overflow fraction, which consists of a tubular section coaxially disposed in the cylindrical section of the chamber with the inlet thereto disposed in a region substantially opposite the feed inlet, and a conduit section joined to the tubular section and leading therefrom to the outside of the chamber, together with float material withdrawal means which comprise a vertical tubular section coaxially disposed in the cylindrical chamber, the inlet at the top end thereof being at an elevation near but below that of the top of the cylindrical chamber, a conduit section joined to the bottom end of the tubular section and leading therefrom to and through the wall of the cylindrical chamber, and means for adjusting the average normal operative rate of flow through the float withdrawal means.

10. The continuous method of obtaining kernels from corn cobs which comprises introducing the corn cobs to a kernel removal station; removing the kernels from the cobs by cutting means whereby a mixture of cobs, silk and kernels is formed; withdrawing the mixture from the kernel removing station and introducing the same into an agitated body of water to which water is continuously added; withdrawing a suspension of water and mixture therefrom; and forcibly and tangentially introducing the suspension into a body of liquid open at the top thereof to the atmosphere and freely whirling about a vertical axis as a free vortex with a gradually decreasing radius of revolution at least at the bottom portion thereof; withdrawing kernels and water from the bottom of the body; withdrawing the remainder of the mixture from a region about the axis substantially opposite the point of introduction and from a region of the top surface of the body adjacent to and surrounding the axis.

References Cited in the file of this patent

UNITED STATES PATENTS

| | | |
|---|---|---|
| 880,430 | Veitch | Feb. 25, 1908 |
| 1,301,544 | Crombie | Apr. 22, 1919 |
| 2,655,263 | Chisholm | Oct. 13, 1953 |

FOREIGN PATENTS

| | | |
|---|---|---|
| 431,552 | France | Sept. 15, 1911 |
| 990,825 | France | June 13, 1951 |